L. T. WEISS.
DRAG FOR FISHING LINES.
APPLICATION FILED MAR. 15, 1919.
1,333,691.
Patented Mar. 16, 1920.
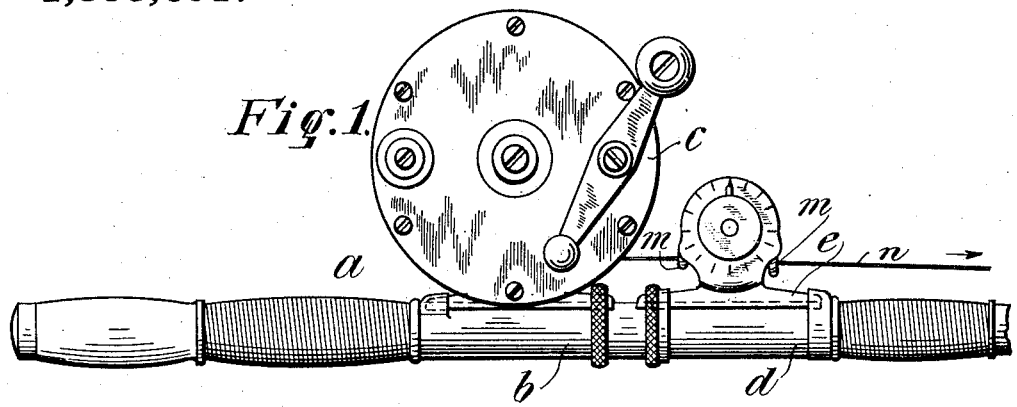
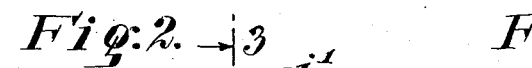
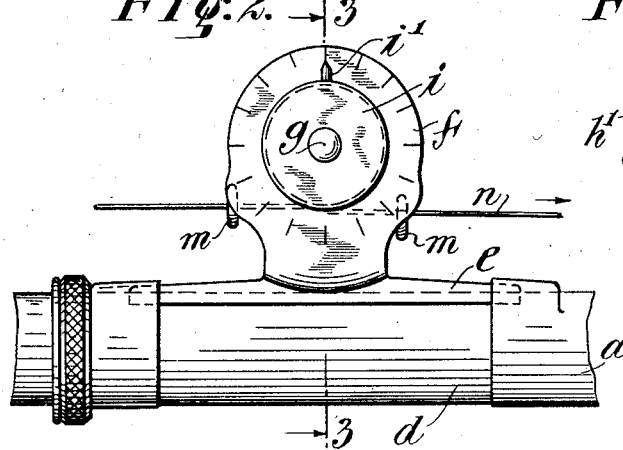
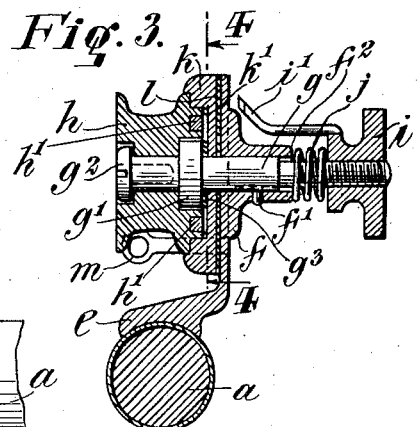
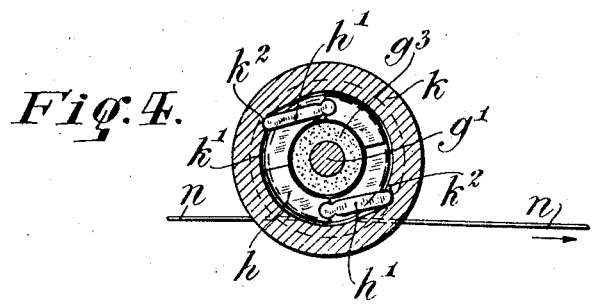
WITNESS:
INVENTOR
Louis T Weiss
BY
Redding & Greeley
ATTORNEYS

UNITED STATES PATENT OFFICE.

LOUIS T. WEISS, OF BROOKLYN, NEW YORK.

DRAG FOR FISHING-LINES.

1,333,691.  Specification of Letters Patent.  Patented Mar. 16, 1920.

Application filed March 15, 1919. Serial No. 282,816.

*To all whom it may concern:*

Be it known that I, LOUIS T. WEISS, a citizen of the United States, residing in the borough of Brooklyn of the city of New York, in the State of New York, have invented certain new and useful Improvements in Drags for Fishing-Lines, of which the following is a specification, reference being had to the accompanying drawings, forming a part hereof.

Fishing reels, adapted to be applied to the butt sections of fishing rods, are commonly provided with clicks or friction devices for the purpose of putting a drag on the fishing line, that is, of creating resistance to the movement of the fish when the fish has taken the hook and is making off with it. Such drags answer the purpose satisfactorily in fishing for the smaller fish, such as trout, bass and salmon, but for the larger fish, such as tarpon and tuna, the amount of drag is so great that if applied to the reel itself through mechanical devices the wear on the reel is excessive. If the drag is applied on the line itself the wear on the line is considerable and moreover the same amount of pressure against the line on the reel drum produces an effect which varies with the diameter of the mass of line on the drum. Moreover, the drag devices applied either to the line or to the reel of the gear for the larger fishes are usually inconvenient of operation, particularly under the stress of excitement when a powerful fish is running off rapidly. The object of this invention is to provide a drag especially adapted for use with the larger fishes, which shall create no wear either upon the reel or upon the line and shall be capable of being adjusted readily to increase or decrease the drag, while at the same time the line shall run free while being wound on the reel. The improved drag is preferably made altogether separate from the reel and may be mounted, in substantially the same manner as the reel itself, upon the butt section of the rod between the reel and the upper handle. The invention will be more fully explained hereinafter with reference to the accompanying drawing in which it is illustrated, and in which—

Figure 1 is a view in side elevation of so much of the butt section of a fishing rod as is necessary to enable the application of the invention to be understood, with the usual reel and the improved drag in position thereon.

Fig. 2 is a similar view but on a larger scale and showing only the drag and a portion of the butt section of the rod.

Fig. 3 is a view in section on the plane indicated by the broken line 3—3 of Fig. 2, looking in the direction of the arrows.

Fig. 4 is a view in section on the plane indicated by the broken line 4—4 of Fig. 3, looking in the direction of the arrows.

The butt section $a$ of the rod to which the drag is to be applied may be of any usual or suitable construction. It is shown as provided at $b$ with the usual reel seat for the usual reel $c$ and is also shown as provided at $d$ with a seat for the reception of the drag to be described, the drag having a plate $e$ to permit it to be secured readily to the rod in the manner of the ordinary reel. The plate $e$ is formed with a carrier plate $f$ which supports a spindle $g$, the latter being capable of end-wise movement, but held from rotation by a pin $f^1$ fixed in the carrier bearing and engaging a longitudinal groove in the spindle. The spindle is formed with an integral collar $g^1$ and receives at one end a headed screw $g^2$, to retain in place the pulley $h$ which is mounted loosely on a spindle. At the other end the spindle is threaded to receive the adjusting nut $i$, which may be provided with a pointer $i^1$. A coiled spring $j$ encircles the spindle loosely between the adjusting nut $i$ and the end of the bearing sleeve $f^2$. Also loosely mounted on the spindle $g$ is a friction plate $k$ which bears through a friction washer $l$, against the corresponding face of the carrier plate $f$, the friction plate being centrally chambered as at $k^1$. The pulley $h$ is provided with pawls $h^1$ which are adapted to engage internal notches $k^2$ in the rim of the friction plate $k$. Guides $m$ may be secured to the carrying plate $f$ and the line $n$, led forward from the reel $c$, is passed through one of the guides, then with four or five turns around the pulley $h$ and then through the other guide $m$ and the usual guides on the rod.

In the operation of the improved drag it will be understood that the pulley $h$ turns with the movement of the line in either direction by reason of the friction between the pulley and the line in its several turns about the pulley. The pulley is so shaped that the several turns of the line about it slip toward the central plane of the pulley, whether the line be moving in one direction or in the other, and that the turns of the line do not pile up one upon another. When the line is being reeled in the pulley turns freely on the spindle, the pawls $l^1$ not engaging with the friction plate $k$, so that no resistance is offered to the reeling in of the line, but when the line is drawn out by the fish the pawls $h^1$, either by reason of their weight or by reason of centrifugal action, swing outwardly and engage the friction plate $k$ so that the pulley and friction plate then turn together. If the adjusting nut $i$ is backed off sufficiently the friction plate $k$ turns freely against the stationary plate $f$, with the interposed friction washer, and there is then no drag upon the line, but if the adjusting nut $i$ is turned up, the friction plate $k$, by reason of the collar $q^1$ on the spindle $q$, acting through the interposed washer $q^3$, is drawn more or less closely against the stationary plate and resistance to its rotation is increased and the drag on the line is increased in proportion, there being no slip of the turns of the line about the spool in the direction of the rotation, especially when the line is damp. By adjusting the nut $i$ the resistance to the rotation to the pulley and therefore the drag on the line can be controlled quickly and conveniently and as previously noted this is accomplished without wear on the line and without wear on the reel. If open guides $m$ are used, as they should be, the necessary number of turns of the line about the pulley can be cast on or off quickly so that the gear can be rigged or unrigged conveniently without reference to the drag.

It will be understood that various changes in the details of construction can be made to suit different conditions of use, the convenience of the manufacturer or the preference of the user, and that the invention, except as pointed out in the accompanying claims is not limited to the precise construction shown.

I claim as my invention:

1. The combination with a fishing rod and a reel mounted thereon, of a line drag mounted on the rod independently of the reel and comprising a pulley adapted to receive turns of the line, means to support the pulley, and devices to create a variable resistance to the rotation of the pulley in one direction and to permit free rotation of the pulley in the opposite direction.

2. A drag for fishing lines adapted to be secured to the rod independently of the reel and comprising a pulley adapted to receive turns of the line, means to support the pulley, and means to create a variable resistance to the rotation of the pulley in one direction and to permit free rotation of the pulley in the opposite direction.

3. A drag for fishing lines adapted to be secured to the rod independently of the reel and comprising a stationary carrying plate, a pulley adapted to receive turns of the line, a friction plate, means to regulate the friction between the friction plate and the stationary plate, and devices whereby the pulley turns with the friction plate in one direction and is free therefrom in the opposite direction of turning.

4. A drag for fishing lines adapted to be secured to the rod independently of the reel and comprising a stationary carrying plate, a pulley adapted to receive turns of the line, a friction plate, means to regulate the friction between the friction plate and the stationary plate, and pawls interposed between the pulley and the friction plate whereby the pulley turns with the friction plate in one direction and is free therefrom in the opposite direction of turning.

This specification signed this 12th day of March, A. D. 1919.

LOUIS T. WEISS.